United States Patent [19]
Hall, III et al.

[11] Patent Number: 5,928,674
[45] Date of Patent: Jul. 27, 1999

[54] APPARATUS FOR THE CONTINUOUS PROCESS FOR EXPANDING THERMOPLASTIC MINIPELLETS

[76] Inventors: Thomas N. Hall, III, 37 Powhatatan Way, Hackettstown, N.J. 07840; Yogesh C. Trivedi, 8297 Hampton, Grosse Ile, Mich. 48138

[21] Appl. No.: 08/954,592

[22] Filed: Oct. 20, 1997

Related U.S. Application Data

[60] Continuation of application No. 08/506,628, Jul. 25, 1995, abandoned, which is a division of application No. 08/253,889, Jun. 3, 1994, Pat. No. 5,580,503, which is a continuation of application No. 07/954,739, Sep. 29, 1992, abandoned.

[51] Int. Cl.$^6$ .................................................. C08J 9/22
[52] U.S. Cl. ............................... 425/4 C; 425/817 C
[58] Field of Search .............................. 425/4 C, 817 C; 264/53; 521/56; 422/133

[56] References Cited

U.S. PATENT DOCUMENTS

| | | | |
|---|---|---|---|
| 3,671,026 | 6/1972 | Mills et al. | 264/DIG. 9 |
| 3,697,454 | 10/1972 | Trimble | 264/DIG. 9 |
| 4,018,946 | 4/1977 | Klein | 264/DIG. 9 |
| 4,448,901 | 5/1984 | Serrda et al. | 264/DIG. 9 |
| 4,525,485 | 6/1985 | Maeda et al. | 264/DIG. 9 |
| 4,602,047 | 7/1986 | Endo et al. | 521/58 |
| 4,676,939 | 6/1987 | Kuwabara | 264/53 |
| 4,686,087 | 8/1987 | Maeda et al. | 422/133 |
| 4,689,351 | 8/1987 | Endo et al. | 521/60 |
| 4,778,829 | 10/1988 | Ichimura et al. | 521/56 |

*Primary Examiner*—Allan R. Kuhns
*Attorney, Agent, or Firm*—James J. Drake

[57] ABSTRACT

The subject invention pertains to an apparatus with the continuous expansion of thermoplastic minipellets, particularly polypropylene. The apparatus comprises a mixing means for mixing the thermoplastic minipellets in water to form a slurry, which is connected to a pressurizing means to form a flow of pressurized slurry to a junction which in trains a blowing agent to form a pressurized slurry mixture, which is connected to a heating means to heat the pressurized slurry mixture. Once the pressurized slurry mixture is impregnated with the blowing agent, it flows through water more orifice plates for expansion of thermoplastic minipellets into an expansion vessel.

13 Claims, 1 Drawing Sheet

APPARATUS FOR THE CONTINUOUS PROCESS FOR EXPANDING THERMOPLASTIC MINIPELLETS

This is a continuation of application Ser. No. 08/506,628 filed Jul. 25, 1995, which is a divisional of 08/253,889, filed on Jun. 3, 1994, now U.S. Pat. No. 5,580,503 issued on Dec. 3, 1996, which is a continuation of 07/954,739, filed Sep. 29, 1992, now abandoned.

BACKGROUND OF THE INVENTION

1. Field of the Invention

The present invention relates to a continuous process for producing expanded beads of a thermoplastic resin and the apparatus used in the continuous process. More particularly, the present invention pertains to a process by which an expanded bead is obtained by continuously pumping a slurry of thermoplastic minipellets containing a blowing agent through a series of impregnation vessels at a predetermined pressure and temperature, and at a sufficient impregnation time to allow the blowing agent to impregnate the thermoplastic particles, and subsequently releasing the slurry into a low pressure expansion tank. Instead of preparing expanded thermoplastic beads batchwise, the present invention continuously feeds the raw materials into a slurry tank for mixing and agitation, following which the slurry is subsequently pumped through heat exchanger(s) and impregnation vessel(s) to impregnate the blowing agent into the thermoplastic minipellets. Unlike the batchwise process, the continuous process need not employ an inert gas filled vapor space to force the blowing agent into the minipellets during the impregnation phase.

2. Description of the Related Art

Prior processes for the manufacture of expandable thermoplastic minipellets revolved strictly around batchwise processes. A typical batchwise process for expanding polypropylene (PP) beads proceeds as follows. A jacketed high pressure vessel such as an autoclave with a typical 400 gallon capacity is charged with thermoplastic beads, water, and a dispersant at atmospheric pressure, and the ingredients are thoroughly mixed by agitation. The raw materials only partially fill the autoclave, leaving a void above the mixture. The autoclave is then closed and the void is purged of any oxygen by pumping an inert gas such as nitrogen through the vessel. Subsequently, a blowing agent such as butane is charged into the autoclave at about room temperature and at a pressure of about 90 p.s.i.g. This pressure and temperature are close to the vapor pressure of butane. Therefore, a slight amount of nitrogen, or inert gas, is charged into the vapor space within the autoclave at 110° F. to 125° F. to raise the pressure inside the autoclave to about 110 p.s.i.g., thus driving the butane into the liquid phase. The charging process of all elements commonly takes about 30 minutes. While agitating the thermoplastic/butane dispersion, the autoclave is steam heated usually above the softening point of the thermoplastic particles for up to 50–60 minutes, or enough impregnation time to ensure that the thermoplastic minipellets are impregnated with the blowing agent. Pressures inside the closed autoclave often rise to 300–400 p.s.i. during the heating process, which is much greater than the vapor pressure of the blowing agent. When the PP beads are sufficiently impregnated with the blowing agent, an inert gas such as nitrogen is released into the vapor space in the autoclave at a high pressure ranging from 400–450 p.s.i. The high pressure nitrogen in the vapor space serves to provide the necessary force to eject all the PP beads out of the autoclave at a pressure high enough to prevent most of the blowing agent from escaping out of the PP beads while in the autoclave. Without the high pressure nitrogen in the vapor space above the slurry, the pressure inside the autoclave decreases as the minipellets discharge, the latter discharged beads experiencing a smaller pressure drop across the orifice ultimately resulting in a wide variance in the degree of expansion in the beads. Once the high pressure nitrogen is charged into the vapor space above the slurry in the autoclave, the contents are evacuated by opening a valve from beneath allowing for a rapid release of the aqueous dispersion through an orifice from a high pressure state within the autoclave to a low pressure state in the evacuation tank. The large sudden pressure drop across the orifice upon release of the dispersion into the evacuation tank causes the blowing agent trapped in the thermoplastic particle to volatize, resulting in an expanded thermoplastic bead. The evacuation process typically takes only 90 seconds to complete. The bulk density of a typical bead at 900 g/l can be lowered to a 15 to 30 g/l expanded bead during the result of the expansion process which is a 30–60 fold volumetric increase. Such large volumetric increases require an evacuation tank considerably larger than the autoclave.

The water and partially dissolved dispersant evacuated along with the beads are separated out from the expanded thermoplastic beads, and the expanded beads are then dried with hot air. Due to the large volume of expanded beads produced at one time in a batchwise process, all equipment employed to receive, separate, and dry the beads must have large capacities to keep the cycle time to a minimum.

The nitrogen/blowing agent gases are released into the atmosphere or may be partially recovered, separated, and collected for future re-use. Various patents illustrating this typical batchwise process are U.S. Pat. Nos. 4,686,087 to Maeda et al; 4,689,351 to Endo et al; 4,602,047 to Endo et al; and 4,676,939 to Kuwabara et al.

There exist several inherent disadvantages in the batchwise process just described. A common cycle time runs about 90 minutes per batch, which introduces a significant production limitation. Equipment costs are high due to the necessity for an autoclave of a sufficient size to hold large batches of the dispersion, an even larger low pressure evacuation tank to accommodate the expanded beads, and large capacity transfer, dewatering, and drying equipment to process the large volume of expanded beads. Nitrogen and blowing agent are lost to the atmosphere, or if recovered, require significant expenditures in collectors/separators. In the batchwise process it is often necessary to prepare many batches for a large order, introducing the risk of deviations in the specified bead quality standard from batch to batch. Another significant drawback is that within a single batch, the butane to mini-pellet ratio is usually not uniformly distributed throughout the batch during the heating and impregnation phase, resulting in significant variations in expansion from bead to bead, often causing greater than a 25 percent drop in product quality. Furthermore, in spite of using high pressure inert gas in the vapor space above the slurry to quickly and forcibly eject the beads out of the autoclave, there still remains enough of a pressure drop within the autoclave to significantly impact the uniformity among the beads. This problem has been partially alleviated by continuously pumping a high pressure inert gas into the autoclave during the release of the beads to maintain uniform pressure, but has not been completely solved by this approach. This solution adds extra equipment costs and does not address the problem of the non-uniform butane to pellet ratio during the heating and impregnation phase.

SUMMARY OF THE INVENTION

It is an object of this invention to produce expanded thermoplastic beads on a continuous basis. It is another object of this invention to impregnate thermoplastic minipellets with blowing agent in the presence of a substantially void free and vapor free space. It is a further object of this invention to expand impregnated thermoplastic minipellets in the absence of a vapor space or a void. Another object of this invention is to uniformly impregnate thermoplastic minipellet with blowing agent. A further object of this invention is to increase the production capacity of expanded thermoplastic beads over a batchwise process.

The inventors herein have discovered a means for achieving the objects, the means being a continuous process for the expansion of thermoplastic particle.

By employing a continuous feed of ingredients into a pressurizing means, a smaller amount of minipellets at a given time are available for impregnation with a blowing agent, resulting in a much smaller variation in butane to minipellet ratio from minipellet to minipellet and a greater consistency in product quality. The continuous process eliminates the need for charging a high pressure inert gas into a vapor space to rapidly and forcibly eject the minipellets through the orifice during expansion, thus removing a major source of wide expansion volume variations encountered in the batchwise process, not to mention operating costs. A preferable aspect of the invention is to impregnate the minipellets with a blowing agent in the absence of a vapor space. Since no inert gases need be introduced in the continuous process, the blowing agent does not become contaminated, unlike the batchwise process, and can therefore be economically recovered and reused. Therefore, an objective is to determine whether the minipellets can be impregnated with the blowing agent in the absence of such a vapor space.

The continuous process also eliminates the batch to batch variations due to human error or measuring imprecision. Once a desired bead is produced in the continuous process, the metered flow of raw materials are set.

Capital investments for the continuous process are low since the continuous process employs a series of inexpensive impregnation vessels, such as pipes, for impregnation by the blowing agent rather than a more expensive high pressure autoclave; the flash vessel in the continuous process may be smaller since fewer impregnated beads are released into the expansion vessel at any one given point in time; and related thereto, large capacity transfer, dewatering, and drying equipment are not needed to dry the expanded beads as would be required in the batchwise process.

DETAILED DESCRIPTION OF THE INVENTION

Figure 1:
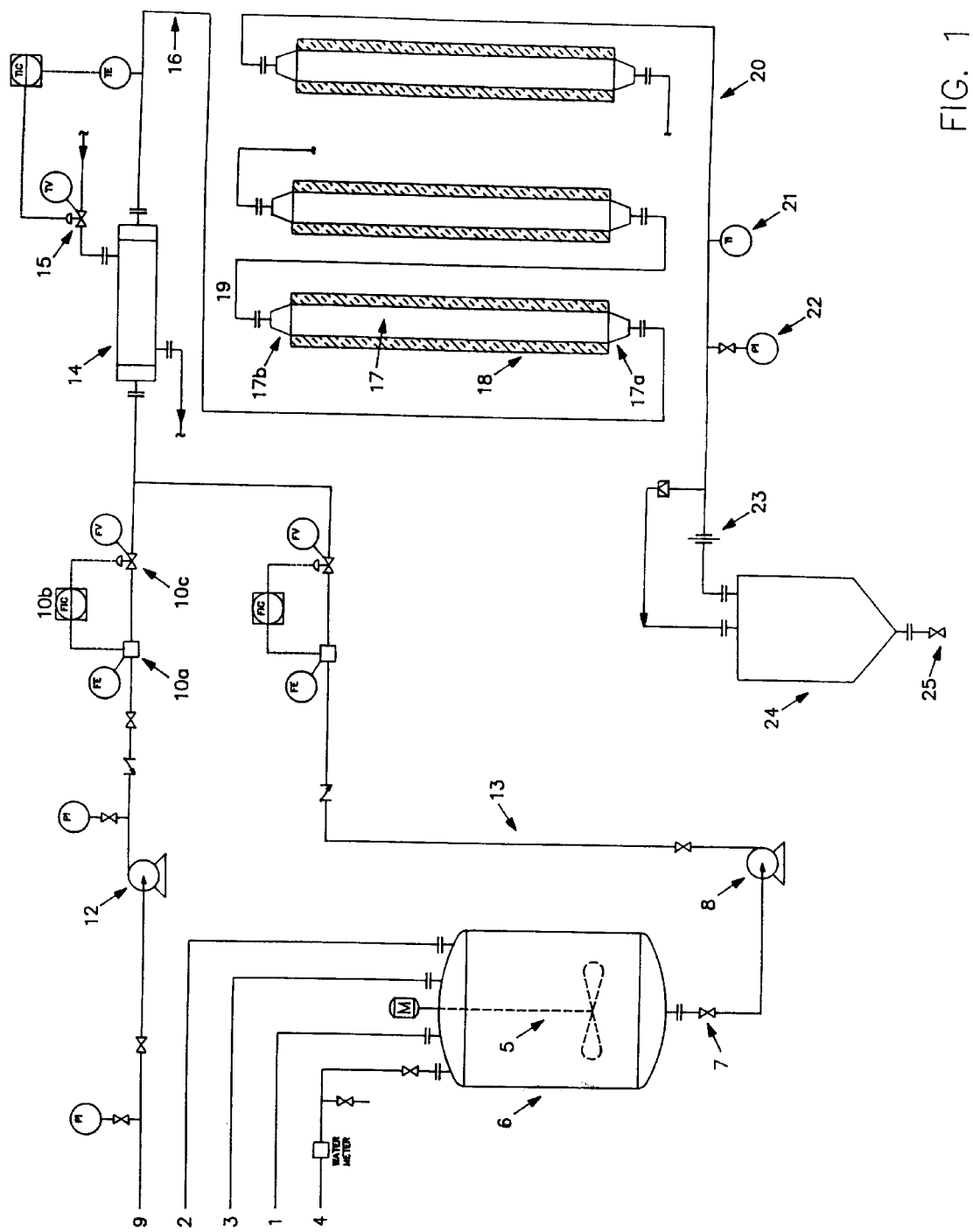
FIG. 1 is a flow diagram showing an example of the apparatus and process used to continuously manufacture thermoplastic beads.

As shown in FIG. 1, various raw materials are metered at a continuous flow into a receiving vessel (6) such as a slurry tank during the charging phase. These materials comprise thermoplastic minipellets (1), water (4), and optionally a dispersing agent (2) and/or a surface active agent (3).

The thermoplastic minipellets (1) are fed into a receiving vessel (6) such as a slurry tank using any system which accurately measures the flow, amount, or weight of particles on a continual basis. One example of such a system is a loss-in-weight system. Suitable flowmeters, whenever used throughout the continuous process, include differential-pressure flowmeters, velocity flowmeters, electromagnetic flowmeters advantageous for use with slurries, and variable area flowmeters. The thermoplastic minipellets (1) are fed into the tank (6) dry or in water as a slurry. As used herein, thermoplastic minipellets refer to the minipellets in their unexpanded state, while expanded thermoplastic beads refers to an expanded or blown minipellet.

The thermoplastic minipellets usable in the present invention include styrene polymers and copolymers, vinyl chloride polymers and copolymers, polyamides, polyester resins, and preferably polyolefin resins. As polyolefin resins there can be employed crosslinked or non-crosslinked particles of low density polyethylene, linear low density polyethylene, medium density polyethylene, polypropylene, ethylene-propylene random or block copolymers, propylene-butene random polymers and propylene-ethylene-butene random copolymers, ethylene-vinyl acetate polymers, ethylene-methylmethacrylate copolymers, silane modified polypropylene, and ionomer resins such as an ionomer resin of ethylene-methacrylic acid copolymer crosslinked with a metal ion in its molecule, poly-1-butene, polypentene, or a terpolymer of an ethylene-acrylic acid and maleic anhydride, and the like. Propylene-ethylene random copolymers having an ethylene content of 1–12 weight percent are highly expandable, and provide better cushioning than their block copolymer counterparts. The polyolefin resins may be used alone or in an admixture. As styrene polymers there can be employed polystyrene, poly-2-methylstyrene, a styrene-maleic anhydride copolymer, a blend polymer of polyphenylene oxide and polystyrene, styrene grafted polyphenylene oxide, styrene-acrylonitrile copolymer, ABS terpolymer, and styrene-butadiene copolymer. Vinyl chloride polymers include polyvinyl chloride, vinyl chloride-vinyl acetate copolymers, and chlorinated polyvinyl chlorides. This list is not limiting and any conventional expandable thermoplastic minipellet may be employed in the process of this invention.

The thermoplastic minipellets used in the present invention are in the form of particles and may take any shape, e.g., sphere, ellipsoid, cylinder, cube, rectangular prism, etc. It is preferred that the particles are substantially uniform in size to obtain greater dimensional uniformity upon expansion. The minipellets have an average diameter of about 0.1 to about 10 mm, preferably 0.3 to 5 mm, as calculated by their sphere volume. The weight of each individual minipellet is from about 0.01 to about 20 mg.

The thermoplastic minipellets may contain inorganic fillers such as talc, clay, diatomeaceous earth, calcium carbonate, titanium oxide, barium, sulfate, zeolites, silica; thermal stabilizers; pigments and dyes; ultraviolet absorbers; lubricants such as metal salts of higher aliphatic acids having 12 to 22 carbon atoms; and anti-static agents.

Dispersing agents (2) are also fed into the slurry tank on a continuous basis using metering systems which can accurately measure the flow, weight and/or amount admitted into the tank, such as a flow meter. By acting as a sort of powder barrier between the minipellets, the dispersing agent exposes more of the minipellet surface area to the blowing agent, enabling a greater amount of and more uniform impregnation. The dispersing agents are preferably mixed with water as a slurry and metered into the slurry tank. Examples of dispersing agent include, but are not limited to, basic tricalcium phosphate, aluminum oxide, titanium oxide, calcium carbonate, and basic magnesium carbonate. It is preferable to use tricalcium phosphate (TCP), $Ca_3(PO_4)_2$, having an average particle size from about 0.01 to 8.0 microns dispersed as an aqueous slurry containing an amount of about 3.0 to 25.0 percent by weight TCP. To assist the solubility of the tricalcium phosphate in the aqueous medium, methanol, ethanol, glycerol, or ethylene glycol may be incorporated into the aqueous solution/slurry. The concentration of dispersing agent in the slurry tank should be sufficient to prevent the thermoplastic particles from clumping.

Another type of dispersant beneficial to the expansion of thermoplastic particles which can be metered into the slurry tank is optionally a surface active agent (3) comprising an anionic surface active agent such as sodium dodecylbenzenesulfonate, sodium alkanesulfonates, sodium salts of alkylsulfates, sodium n-paraffinicsulfonate, sodium salts of olefin sulfates, acylmethyltaurines, and sodium dialkylsulfosuccinates; a nonionic surface active agent such as a polyoxyethylene alkyl ether, polyoxyethylene fatty acid ester, polyoxyethylene alkyl phenol ether, sorbitan fatty ester, or polyoxyethylene sorbitan fatty acid ester; and an amphoteric surface active agent such as alkylbetaines and alkyldiethylenetriaminoacetic acid. These surface active agents help draw the blowing agent into the aqueous phase, thereby improving the degree of impregnation. A preferred surface active agent is sodium dodecylbenzenesulfonate (DBSNa).

As shown in FIG. 1, water (4) is metered into the slurry tank through a flowmeter.

The continuous process parameters and apparatus used to prepare the thermoplastic beads are now explained in greater detail.

The dispersing agent (2), surface active agent (3), water (4), and thermoplastic minipellets (1) are continuously and individually fed into a mixing zone such as a receiving vessel (6) or a slurry tank to achieve tighter control of bead quality. Instead of employing individual feed streams, however, one may optionally combine all or some of the ingredients into a single feed stream prior to metering.

The proportion of water, minipellets, and optionally dispersing agent and surface active agent are determined quickly and easily by routine experimentation since the process is continuous and the effect of individual ingredient flow adjustments on bead quality is readily apparent. One need not employ the costly and time consuming batch by batch procedure to determine optimum proportions of ingredients, which becomes more complicated when the expansion specifications change from job to job. In the continuous process, a much smaller volume of minipellets are expanded at any given time, decreasing the amount of off-specification material and making adjustments more economical. Although the proportions of ingredients may vary as the nature of the ingredients change and/or the desired expansion volume or bead quality specification is modified, some preliminary design ratios are herein set forth.

The concentration of the pellets at a given bulk minipellet density is adjusted according to the desired breadth of the distribution curve. A wide variance among bead sizes, or a broad distribution band, is an indicator of non-uniform impregnation due to an excessively high minipellet concentration for the given amount of blowing agent supplied, the temperature, and the pressure in the system.

The concentration of thermoplastic minipellets in the mixing zone ranges from about 1 percent by weight to about 30 percent by weight of the total ingredients in the slurry tank including water. In the batchwise process, pellet concentrations typically run about 37 percent. An amount of minipellets greater than 30 weight percent in the expansion system at any given time tends to yield portions of underexposed and underexpanded beads. With the ability to lower the concentration in the continuous process, each minipellet has a higher probability of uniform exposure to the blowing agent, resulting in a decreased off-specification material. The optimum pellet concentration is one that yields maximum production capacity while maintaining a narrow bead size distribution band. The preferable concentration of polypropylene pellets is about 5–15 weight percent to achieve optimum production capacity and a narrow margin of deviation in bead quality.

The amount of dispersing agent solution/slurry used depends on the nature of the dispersing agent, and the kind and amount of thermoplastic minipellet used. Typically, the amount of dispersing agent solution/slurry required for a polypropylene minipellet slurry ranges from about 3 to about 15 weight percent based on the weight of all ingredients in the slurry tank or about 0.25–1.15:1 ratio of dispersing agent solution/slurry to minipellet by weight. The dispersing agent solution/slurry contains about 3.0–25.0 weight percent dispersing agent. Since the continuous process expands a lower concentration of pellets in the stream than the batchwise process, it is believed that the amount of dispersing agent required to effectively perform its function is proportionately reduced.

The amount of water in the mixing zone at any given time should be sufficient to disperse the pellets for optimal uniform exposure to the blowing agent downstream, while maintaining high productivity. To this end, the amount of water should be from about 60 weight percent to about 99 weight percent, preferably about 80 weight percent to about 90 weight percent, based on the weight of all ingredients in the slurry tank.

The surface active agent, such as sodium dodecylbenzenesulfate, is utilized in an amount from about 0.0001 weight percent to about 0.1 weight percent based on the weight of all ingredients in the slurry tank, preferably 0.0008 weight percent to about 0.003 weight percent. The surface active agent eases the blowing agent into solution by decreasing the surface tension of water. The amount should be sufficient to assist absorption of the blowing agent into substantially all the minipellets.

The thermoplastic minipellets, water, and optionally dispersing agent and the surface active agent are continuously fed under about atmospheric conditions into the mixing zone, such as a receiving vessel (6), or a slurry tank, wherein the ingredients are mixed to form a slurry. This phase is classified as the mixing phase. Since impregnation occurs downstream, the receiving vessel (6) need not withstand the high pressure and temperature conditions during the impregnation stage experienced in the batchwise process. It is not necessary to utilize an autoclave, but rather any holding tank will suffice. The receiving vessel is preferably closed to the atmosphere and more preferably further padded with an inert gas blanket, such as nitrogen, above the raw materials, at a pressure sufficient to drive out and prevent atmospheric oxygen from entering the receiving vessel. Such pressures typically range from six (6) inches of water column to 30 inches of water column above atmospheric pressure. The purpose of an enclosed vessel, and one in which is maintained by an inert gas pad throughout the charging phase, is to prevent atmospheric oxygen from entering into the slurry stream, which when mixed with butane and heated, forms an explosion hazard. Alternatively, the mixing zone may comprise a junction containing a mixing blade to which separate feed streams are attached, producing a homogeneous slurry, which in turn is fed directly to the pressurizing phase without first entering a receiving vessel. Rather than a mixing blade, the separate feed streams may be impingement mixed into a single stream feeding the pressurizing means. It is preferable, however, to use a slurry tank preferably equipped with a means for agitation.

Although it is not necessary to heat the slurry mixture in the mixing zone prior to the heating phase, discussed below, it is preferable to subject the slurry to a pre-heating phase while the mixing zone, more preferably during continuous agitation to further dissolve the dispersing agent, coat the pellets, and provide for a more efficient impregnation process. The requisite temperature to achieve the objects of the invention primarily depends on the nature of pellets in the tank. Typically, a receiving vessel or pipe leading to the pressurizing means can be heated to about 90° F. to about 130° F., preferably 120° F., to pre-heat minipellets such as polypropylene. The heat is provided by a heating means such as high pressure steam flowing through a jacket around the receiving vessel or pipe.

The exit port is located at a position where optimum homogeneity is most likely. Although distinct macroscopic phases exist between the solid thermoplastic minipellets and the water medium, the phrase "substantially homogeneous" as used throughout the specification means a uniform distribution of solid thermoplastic minipellets throughout the water medium; and beyond the entrainment phase, a uniform distribution of thermoplastic minipellets throughout the water and blowing agent media. To maintain a substantially homogeneous concentration of minipellets leaving the receiving vessel, it is important to maintain turbulent conditions within the receiving vessel lest a disproportionate share of the minipellets consolidate on the surface of the water, resulting in a lower than anticipated minipellet concentration exiting the tank. Thus, the receiving vessel is designed, to the extent practicable, to obtain complete mixing so that the composition of the exiting stream is substantially the same as the composition being mixed in the vessel. Thermoplastic minipellets may be released into the bottom half of the receiving vessel through side or bottom ports or may be released into the upper half of the vessel through ports on the upper half or the top. The receiving vessel is preferably designed to achieve mass flows of the slurry exiting the tank, rather than a plug flow, thereby providing a uniform flow, preventing hang-ups or surges, and provide a first-in-first-out flow pattern to the extent possible. As a means toward achieving complete mixing and a mass flow exit pattern, the receiving vessel is equipped with a means for agitating the slurry mixture including, but not limited to, jet compressors or variable speed impeller(s) (5). The slurry may be agitated intermittently or continuously, preferably continuously. A multistage vessel equipped with multiple baffles and multiple impellers can be employed. The baffles are employed to achieve more uniform mixing and eliminate vortices.

The slurry exits the charging phase on a continuous and substantially homogeneous basis under atmospheric pressure, or thereabout, and flows through a pipe to a means for generating a pressure of about 300 to about 550 p.s.i.g., preferably about 350 to about 450 p.s.i.g. This stage in the process is classified as the pressurizing phase. The pressurizing phase forms a turbulent flow of pressurized slurry at a substantially constant mass flow rate and preferably in a substantially vapor free space. As used throughout the specification, a "substantially free vapor space" means less than 2.0 volume percent void or vapor per cubic meter of space within the vessel, preferably less than 0.001 volume percent void or vapor per cubic meter of space within the vessel. A "substantially constant mass flow rate" is defined as a mass flow rate not deviating more than 10 percent of a preselected rate. It is preferable that the mass flow rate not deviate more than 2 percent, most preferably not more than one (1) percent.

One may optionally pad the receiving vessel feeder system discussed above with a nitrogen blanket, resulting in some nitrogen entrainment in the slurry flow throughout the process. However, rather than using high pressure inert gas above a slurry batch to ensure constant pressure within the tank during expansion, the process relies upon the hydraulic pressure supplied at the pumps to continuously expand the minipellets. It is preferable to maintain a substantially free vapor space throughout the continuous system beyond the pumps.

Means for generating the requisite amount of hydraulic pressure include a positive displacement pump (8) suitable for pumping a slurry, such as a reciprocating diaphragm pump or a reciprocating piston pump preferably with a large displacement to reduce the cycle rate, thereby minimize damage that may occur to the pellets. Diaphragm pumps have the advantage of avoiding damage to the pellets, but have difficulty generating the high pressures needed. Double or sandwich diaphragm arrangements can be used. More preferred are piston pumps. Pulsations in flow from piston pumps can be substantially abated by using a multiple acting pump and/or adding cylinders to cause overlap between the wave motion of each individual cylinder flow. Examples are single or double acting duplex, triplex, quintuplex pumps, and so forth. Another pumping means for generating flow in this pressure range includes a centrifugal pump equipped with a special impeller for pumping colloidal suspensions. The centrifugal pump can be multistaged to increase pressure in the line. Another pumping means, combining kinetic and displacement flows, includes a mobile separator type or reciprocating pump employing one to three cylinders fed by centrifugal pumps.

The mass flow rate of the slurry throughout the process beyond the pump(s) is adjusted at the variable speed pump (s) to provide the desired impregnation time needed to ensure thorough impregnation of the pellets. The mass flow rate ranges from about 30 lb/min to about 500 lb/min, preferably about 40 lb/min to 160 lb/min, more preferably about 120 lb/min to obtain satisfactory impregnation times. Once the desired rate of flow is determined, it is preferably kept-substantially constant throughout the process to ensure uniform impregnation of the pellets. Furthermore, the pressure of the slurry mixture at the orifice during the expansion phase should remain at or above 300 p.s.i.g., preferably above about 350 p.s.i.g., to ensure adequate expansion of the pellets. Thus, one must account for frictional losses through the piping system and appropriately adjust the power at the pump(s).

The flow characteristic of the slurry throughout the piping system beyond the pump(s) must be turbulent to maintain a homogeneous dispersion. As used herein, the "piping system" refers to all pipes between the pressurizing means to the orifice plate in the expansion phase, including pipes within the heat exchanger, if any, and those connecting the impregnation vessels, if more than one is employed, but excluding the impregnation vessels. The flow velocity, slurry density and viscosity, and diameter of the pipe are adjusted to ensure that the Reynolds number $Re >$ about 4000. These factors can be adjusted within the parameters of the following equation:

$$Re > 4000 > \frac{\rho V d}{\mu}$$

where P is fluid density, V is flow velocity, d is the diameter, and $\mu$ is fluid viscosity; or in terms including volumetric flow rate Q:

$$Re > 4000 > 50.6 \frac{Q\rho}{d\mu}$$

A pipe size is selected with a relative roughness and friction factor for complete turbulence. Allowing the flow to become laminar causes the pellets to aggregate along the walls of pipe where the flow velocity is minimal resulting in clogging, substantial reduction in pellet concentration, and severely underexpanded pellets. In laminar flow through the piping system, the liquid phase comprised of blowing agent and water will tend to flow along the center stream in the pipe past the pellets congregated along the walls without sufficient contact time for an adequate impregnation. Thus, it is critical to maintain a turbulent flow throughout the piping system.

The pumped slurry mixture flows in a pipeline (13) to a junction where the blowing agent is entrained, classified as the entrainment phase. The blowing agent is metered to the slurry mixture pipeline in a liquid state to prevent build-up of vapor spaces, which in some cases may be an explosion hazard. As an example of a metering unit, a flow indicator controller (10(b)) regulates the flow rate at flow valve (10(c)) depending on measurements taken at flow gauge (10(a)). The metered blowing agent is pumped at a mass flow rate of about 0.1 lb/min to about 10 lb/min to maintain a constant ratio of blowing agent to minipellet, and preferably at substantially the same pressure as in slurry pipeline. At this stage, the pressurized slurry becomes a pressurized slurry mixture. The precise flow rate of blowing agent is determined by the desired weight percentage of blowing agent in the slurry discussed below.

The blowing agents to be impregnated into the thermoplastic minipellets include any organic compound having a boiling point of −50° C. to not more than 80° C., including but not limited to, aliphatic hydrocarbons such as propane, n-butane, i-butane, butylene, i-butene, pentane, neopentane, hexane and heptane; alicyclic hydrocarbons such as cyclohexane, cyclopentane and cyclobutane; halogenated hydrocarbons such as trichloromonofluoromethane, dichloromonofluoromethane, dichlorodifluoromethane, dichlorotetrafluoroethane, trichlorotrifluoroethane, methyl chloride, methylene chloride, ethyl chloride, and the like. It is conceivable that inorganic gases like nitrogen, helium, argon, and carbon dioxide could be used as the blowing agent. However, organic blowing agents possess superior expansion capabilities and liquify at higher temperatures than inorganic gases, and are, therefore, preferred. Especially preferable is butane. The organic blowing agents can be used singly or as a mixture of two or more.

The amount of blowing agent added to the slurry depends primarily on the desired bulk density of the beads. At a constant minipellet concentration, pressure, temperature, and impregnation time, an increase in the amount of blowing agent lowers the bulk density of the bead up to a certain threshold value, at which point the cells begin to rupture ruining the beads rather than lowering their bulk density. The blowing agent to minipellet ratio is about 0.2–0.5:1 by weight, preferably about 0.25–0.40:1. Less than about a 0.2:1 blowing agent to minipellet ratio results in underexpanded beads, while a ratio exceeding about 0.5:1 produces ruptured beads.

Once the blowing agent is entrained in the slurry, the pressurized slurry mixture flows under turbulent conditions through a pipe to an impregnation phase. The temperature of the thermoplastic minipellets in the impregnation phase is elevated to a temperature effective to soften the thermoplastic minipellets contained in the slurry mixture, and permitted to reside for a time sufficient to impregnate the softened thermoplastic minipellets with the blowing agent. The heating and residence time for impregnation may be accomplished in one step or distinct steps. Described below is a process wherein the impregnation phase is broken into two discrete process steps; the first step comprising passing and heating the pressurized slurry mixture through a means for heating, the second step comprising passing the slurry mixture from the heating means through one or more impregnation vessels for a time sufficient to impregnate the minipellets with the blowing agent. Other processes wherein the heating and impregnation are accomplished in one step are described further below as alternative embodiments.

The pressurized slurry mixture flows from the entrainment phase to a heating means (14) such as a heat exchanger. The pressurized slurry mixture is heated to a temperature effective to soften the thermoplastic minipellets contained in the slurry mixture, typically from about 200° F. to 300° F., permitting the blowing agent to begin impregnating the minipellets. The temperature will vary depending on the amount and nature of the minipellet flowing through the heat exchanger, but for the vast majority of applications, the temperature ranges preferably from about 220° F. to about 280° F., more preferably about 240° F. for polypropylene pellets.

In the conventional batchwise process, the pressure generated in the autoclave is a function of the heat up profile. On the other hand, the pressure build up in the continuous process is independent of the heat up profile, thus adding a greater measure of flexibility to design parameters. One may adjust the heat up profile and the pressure profile independently at any time throughout the process. The desired pressure in the piping system of the continuous process is generated by the pump(s) rather than a heating means. Thus, in the continuous process, the pressure of the slurry is preferably raised to the desired level prior to applying heat sufficient to soften the minipellets.

The heating means (14) may be equipped with a pressure relief valve to prevent exceeding the piping system limits, or alternatively, the pressure generated at the pump can be adjusted to compensate for the rise in pressure occurring in the heat means. Optionally, the inlet for the heating medium maybe equipped with a valve (15) regulated by the temperature indicator controller from measurements taken by a temperature indicator located on the pipe (16) exiting the heating means, thereby closely controlling the temperature of the slurry mixture. Heating means include heat exchangers such as a double-pipe exchanger, a shell-and-tube exchanger, a spiral-tube exchanger, plate type exchangers, and a spiral-plate exchanger. In the alternate embodiment below, the heat exchanger is the one or more jacketed impregnation vessels. The heating medium flowing through the jackets around the vessel(s) heats the pressurized slurry mixture to the softening point of the minipellets and simultaneously permits the minipellets to reside within the vessel (s) for a time sufficient for impregnation to occur.

The heat exchanger may be positioned horizontally or vertically. However, an homogeneous mixture must be maintained. The easiest means for ensuring a homogeneous mixture is to maintain a turbulent flow. One or more exchangers may be employed in series if needed to continue effecting heat transfer, or in parallel if the heat exchanger cannot accommodate the volume of the slurry stream.

Upon exiting the heating means, the slurry stream flows through pipe (16) under turbulent conditions to one or more impregnation vessels, preferably to a bank of impregnation vessels, of which impregnation vessel (17) is a representative part. This stage is classified as the impregnation phase. The impregnation vessels function to provide the minipellets with sufficient time to become impregnated with the blowing agent. Although some degree of impregnation occurs as the temperature of the minipellets approach or exceed their softening point, as in the heat exchanger, a sufficient impregnation time is the time necessary for the minipellets to achieve the desired density upon expansion. Insufficient impregnation time will produce some or many beads that are underexpanded or not expanded at all.

The impregnation vessels are comprised of a series of insulated (18) or jacketed pipes in a substantially vertical arrangement, each pipe being equipped with an inlet (17(*a*)) positioned at the lower end of the pipe through which the slurry mixture enters and an outlet (17(*b*)) at the upper and through which the slurry mixture exits. The pressurized slurry mixture enters into the substantially vapor free space within the one or more impregnation vessels and rises vertically for a time sufficient for impregnation. A "substantially vertical" impregnation vessel is one which is sufficiently normal to the horizontal plane of earth to maintain a first-in-first-out minipellet flow pattern at a predetermined mass flow rate greater than 30 lb/min.

The inner diameter of the impregnation vessel is limited at the upper end of a size range to ensuring that the rise velocity of the water inside the impregnation vessel is substantially equal to or greater than the free rise velocity of the softened thermoplastic minipellets, thus providing for a uniform and homogeneous mixture throughout. The free rise velocity of the minipellet is determined experimentally by measuring the time necessary for a softened minipellet contemplated for actual use to traverse a given distance released from a point near the bottom of a container containing the same ingredients as in the aqueous medium contemplated for actual use and under the same contemplated temperature and pressure conditions, and allowed to freely rise upward in the aqueous medium to a preselected point below the level of the aqueous medium.

The impregnation vessels are vertically oriented to allow the minipellets time for impregnation while maintaining a substantially homogeneous mixture. Each impregnation vessel (17) is connected in series by pipes (19) of a smaller inner diameter than the inner diameter of the impregnation vessel to which it is connected. The inner diameter of pipes (16) and (19) are made sufficiently small to increase flow velocity and maintain or effect turbulent flow. The larger inner diameter impregnation vessels provide the impregnation time necessary for impregnation by slowing down the mean flow velocity of the slurry mixture. Immediately prior to entry in the one or more impregnation vessels, as in pipes (16) and/or (19), the pressurized slurry mixture has a first mean flow velocity which is greater than the second mean flow velocity of the pressurized slurry mixture within the one or more impregnation vessels. A "mean flow velocity" is the mean velocity of the minipellet, water, and blowing agent flow rates. Since the mass flow rate in the piping system and in the impregnation vessels remains substantially constant, increasing the cross sectional area of the impregnation vessel by enlarging the inner diameter results in a second mean flow velocity less than the first mean flow velocity. The size of the inner diameter of the impregnation vessel is limited at the upper end of the size range to ensuring that the rise velocity of the water is at least substantially equal to or greater than the free rise velocity of the softened thermoplastic minipellets, and at the lower end is limited by cost efficiency and the pressure drop caused by the increased number impregnation vessels required to provide the desired impregnation time. Preferably, the optimum inner diameter of each impregnation vessel is one in which the rise velocity of the water is sufficiently greater than the free rise velocity of the minipellets to prevent the minipellets from agglomerating along the pipe walls and to maintain substantial homogeneity, yet slow enough to maximize the residence time of the minipellets in the vessel.

It is not necessary to maintain turbulent flow inside the impregnation vessels to ensure homogeneity, so long as the rise velocity of water is substantially equal to or greater than the free rise velocity of the minipellets. In the impregnation vessels, while it is preferred to maintain a turbulent flow, a flow within the transition zone between laminar and turbulent is also suitable . Since the slurry has a viscosity approximately that of water, the flow within the impregnation vessel will be Re >4000 for turbulent flow, and 2000< Re <4000 if within the transition zone.

The time needed to impregnate the minipellet at its softening temperature ranges from about 10 minutes to 80 minutes, and depending on the amount and kind of pallet, most often from 25–45 minutes. At a temperature of about 240° F. and a 30 minute impregnation time, to impregnate polypropylene beads with butane the number of impregnation vessels is preferably 16 each having a 6" inner diameter, at a mass flow rate of 120 lb/min through a 2" diameter piping system.

The number and diameter of impregnation vessels are determined by known factors such as the impregnation time, mass flow rate and flow velocity. Since it is impractical to vary the arrangement and geometry of impregnation vessels once installed, it is preferable to install impregnation vessels designed according to optimally calculated conditions for the type of pellet one contemplates on commercializing. Additional impregnation vessels with or without varied diameters may be installed, with valves fitted on the primary bank of impregnation vessels to re-route or further route the slurry stream to any desired additional impregnation vessel, thereby adding a greater degree of flexibility to the system. The valves on each impregnation vessel are also useful to allow one vessel to be cleaned while the other vessels are in use.

The inlets (17(*a*)) and outlets (17(*b*)) at each end of the impregnation vessels are shaped as concentric cones with a large diameter circular base attached to or integral with the impregnation vessel and tapering in a dome or trumpet fashion to a smaller diameter attached or integral with the piping system. The smallest inner diameter of the concentric cone shaped inlet or outlet is preferably equal to the inner diameter of piping (16) and (19) connecting each impregnation vessel, if more than one. The largest diameter of the concentric cone shaped inlet or outlet is preferably equal to the inner diameter of the impregnation vessel. The geometric shape at the inlet of the impregnation vessel helps to maintain an even distribution of pre-softened pellets upon entry into the vessel. At the outlet section of the impregnation vessel, the cone shape acts to sweep the presoftened pellets into the smaller diameter pipe and avoids the aggregation that would occur if the smaller inner diameter pipe

(19) were attached to a flat horizontally surfaced outlet. The smaller diameter section of the cone connected to pipe (19) is optionally dome shaped for improved entry and exit performance.

The pipes and/or impregnation vessels may optionally be surrounded with jackets through which heating media such as steam, hot oil, or glycol flow. The impregnation vessels may preferably kept at above room temperature through the optional jackets to maintain the softening temperatures in the slurry stream. The pipes (16) and pipes (19) connecting each impregnation vessel may also be jacketed to adjust, maintain or increase the temperature of the pressurized slurry mixture.

Upon exiting the last impregnation vessel, the pressure in the pipe (20) is a minimum of 300 p.s.i.g. and preferably is substantially the same as upon entry into the first impregnation vessel, taking into account frictional losses. The impregnated pellets are then piped under turbulent conditions through an orifice plate (23) and are released into an expansion vessel (24) comprising the low pressure zone, the differential pressure between the low pressure zone and the pressurized slurry mixture behind the orifice plate prior to ejection being sufficient to cause the impregnated blowing agent to suddenly volatize and thereby expand the thermoplastic minipellet into a thermoplastic bead. This stage is classified as the expansion phase.

As the orifice (23), a nozzle type or a venturi type can be used. The orifice hole diameter is designed sufficiently small to maintain the back pressure of at least 300 p.s.i.g in the piping system, but larger than the size of an individual impregnated softened pellet to prevent clogging. For a 2" diameter pipe (20), the orifice hole is preferably about ⅜" in diameter. The hole can be any shape, including a circular, oval, or polygon shape. A pressure relief valve may be installed in the pipe across the orifice. A pressure gauge (22) and a temperature gauge (21) located on pipe (20) prior to the orifice (23) allow measurement for appropriate adjustments to the process upstream.

The expansion vessel (24) receives the beads, water, dispersing agents, and blowing agent sprayed through the orifice (23). The expansion vessel is maintained from about atmospheric pressure to about a pressure of ten inches of water. The differential pressure behind the orifice plate and within the expansion vessel must be at least 300 p.s.i. to effect the blowing action and produce expanded thermoplastic beads. The beads and water accumulated in the expansion vessel are discharged through a drain valve (25) located below. The large blower and heat exchanger typically used at this stage in the batch process are not needed since only small number of beads need drying at a given point in time. The fluidized bed dryer can be of the continuous type, a batch fluid bed with continuous removal of dry product or a batch fluid bed that fills up and dries discreet batches.

The blowing agent volatized upon release of the pellets into the expansion vessel is recovered through a line communicating (not shown) with the vessel leading to a gas collector by, for example, a suction pump. The collected blowing agent is recycled back to the blowing agent charge in the entrainment phase, preferably in the liquid state, or is directly fed to the boilers in a gaseous or liquid state, providing steam for the heat exchanger.

The water drained off from the thermoplastic beads is fed at regular intervals through a screen of sufficiently small mesh to trap undissolved dispersing agents and/or surfactants, such as TCP, which may be re-cycled back into the feed hopper.

This continuous process described above has several advantages over the batchwise process. The batchwise process requires the presence of an inert gas such as nitrogen in the vapor space above the slurry during the impregnation phase to keep the blowing agent in the liquid phase and prevent it from volatizing. In contrast, the continuous process makes use the high pressures in the system exceeding 300 p.s.i.g. generated by the pumps as the means by which to prevent the blowing agent from volatizing. Thus the continuous process results in cost savings and processing efficiency as a result of foregoing this step. In the batchwise process, high pressure inert gas, such as nitrogen, is pumped into the autoclave to prevent the pressure within the autoclave from dropping below a threshold value during discharge. Nevertheless, during release of the minipellets through the orifice, the pressure inside the autoclave varies as the slurry drains and leaves behind a void, causing the later released minipellets to expand at a pressure differential different than the earlier released minipellets, resulting in non uniform expansion. As means for solving this problem, a high pressure inert gas is continuously pumped into the autoclave during discharge to maintain uniform pressure as the slurry drains out through the orifice. In this process of the present invention, however, the high pressure inert gas pumped into the vessel prior to and during discharge of the slurry through the orifice is dispensed with. In the process of this invention, a continuous supply of slurry under high pressure is present throughout the piping system beyond the pumps, preventing variances in pressure at the orifice as the slurry is ejected. The presence of a constant and continual backpressure at the orifice plate results in uniform pressure differentials upon discharge, producing extremely small variances in density from bead to bead and a narrow expansion distribution range. Furthermore, the high pressure nitrogen charging step is eliminated resulting in time and cost savings.

A further advantage achieved by eliminating high pressure inert gases prior to and during discharge of the slurry characteristic of the batchwise process is that no inert gas is present in the expansion vessel alongside the blowing agent gas, thus eliminating the need to separate inert gases from the blowing agent prior to collection and recycling. Eliminating the separation phase between the blowing agent and the inert gas makes recycling more economically feasible.

Since the process is continuous, the production capacity is greatly increased over the batchwise process at a given capital expenditure. Furthermore, the concentration of minipellets in the stream at any given point in time is smaller than in the batchwise process, thereby increasing the probability of uniform impregnation.

An alternative embodiment combines the heating phase and the impregnation phase into one step. After the entrainment phase, the pressurized slurry mixture enters the bank of impregnation vessels, one or more of which are provided with jackets through which a suitable heating medium such as steam, hot oil, or glycol flows. The temperature of the heating medium provides the heat necessary to warm the slurry mixture to the softening point of the minipellets as the slurry mixture is flowing through the one or more impregnation vessels. Thus, a separate heat exchanger to preheat the slurry mixture prior to entry into the impregnation vessels is dispensed with as the jacketed impregnation vessels act as a heating means. The temperature of the heating medium may be substantially constant around each impregnation vessel, or may be gradually or stepwise increased as the slurry mixture progresses through subsequent impregnation vessels, thus heating the slurry mixture quickly or gradually.

A second alternative embodiment of the present invention dispenses with the bank of impregnation vessels, and in their place, uses one or a series of heating means as both the source of heat and the impregnation vessel. For example, the slurry mixture may enter a bank of heating means, preferably heat exchangers such as a shell and tube type, the bank comprising one or more heat exchangers each attached in series with connecting pipes. The flow of slurry mixture through the connecting pipes is turbulent to maintain homogeneity. Unlike the previous embodiments of the invention, however, the flow of slurry mixture through the bank of heating means is also turbulent, especially when shell and tube exchangers are employed, with the slurry mixture flowing through the tube. Without turbulent flow, the softened minipellets begin adhering to the walls of the small diameter tubes in the shell and tube exchanger, causing clumping and ultimately clogging. In this embodiment, the heat exchangers may be horizontally or vertically oriented. The length of tubing required depends on the desired impregnation time, tube diameter, flow velocity, and flow rate. A second or third bank of heat exchangers can be attached in parallel to the first bank of heat exchangers to accommodate high volumes of slurry.

The following example will demonstrate that thermoplastic minipellets can be impregnated without using an inert gas-filled vapor space and subsequently expanded through the orifice plate during the expansion phase, thus satisfying the previously stated objective of expanding minipellets without pumping a high pressure inert gas into a vapor space above the slurry during the impregnation phase. The absence of a vapor space simulates the conditions of a full pipe during the impregnation phase.

EXAMPLE

A one gallon autoclave with a 3500 p.s.i.g. relief and a double agitator is charged with 5.0 wt. percent of polypropylene/polyethylene random copolymer minipellets having about 2.5 wt. percent polyethylene and a bulk density of 50.0 g/L. A 20 wt. percent tricalcium phosphate aqueous solution/slurry in an amount of 5.16 wt percent was charged into the autoclave. Next, a 2 percent DBSNa solution in an amount of 0.02 wt percent was charged into the autoclave. At this stage, agitation of the contents in the autoclave commenced at about 90 r.p.m. As soon as agitation started, the autoclave was cooled with water to about 40° F., and evacuated to about 7 mm Hg with a vacuum pump protected by a dry ice trap. Next, a butane filled bomb was connected to an inlet port above the autoclave and charged in an amount 1.6 wt. percent. Once the butane charge was completed, the void space above the slurry inside the autoclave was completely filled with city water to an amount of about 88.21 wt. percent. A hydrostatic tester was used to register a rise in pressure during the water charge, indicating when the autoclave was full. The reactor was heated to 50° C. utilizing high pressure steam in the jacket of the autoclave, and maintained for 6 minutes at that temperature until the pressure reached 700 p.s.i.g. as determined by the hydrostatic tester. At that point, the temperature was increased gradually to 130° C. at 2.6° C./min. for 31 minutes while maintaining a pressure between 320 to 680 p.s.i.g. by bleeding off high pressure steam through a needle valve. When the temperature reached 130° C., the bottom plug valve was opened, and then the ball valve beneath the autoclave was opened rapidly to allow the content to discharge through a ½" pipe into a drum with the butane flashing off.

RESULTS

A 25 ml sample of beads taken from the batch and weighed measured a bulk density of 32.5 g/L; indicating the process had blown the pellets in the absence of an inert gas filled vapor space characteristic of the conventional batchwise process. The experiment confirmed that polypropylene minipellets completely enveloped in a fluid environment, as in a pipe, can be successfully impregnated by the blowing agent and thereafter expanded, without using an inert gas filled vapor space to drive the butane into the liquid phase.

As was expected from the crude method and equipment used during discharge, however, the expanded beads were not of commercial quality. Since the pressure inside the autoclave rapidly decreased as the contents discharged, the beads were not uniformly expanded. However, a constant back pressure applied to an orifice plate during discharge in a continuous process plant will ensure beads of uniform expansion.

What we claim is:

1. An apparatus for the continuous production of expanded thermoplastic beads comprising the following equipment:

a) a mixing means effective for feeding and mixing at least thermoplastic minipellets and water to form a slurry, connected to;

b) a pressurizing means effective to form a flow of pressurized slurry to;

c) a junction for entraining a blowing agent charge into said pressurized slurry to form a pressurized slurry mixture, the junction connected to;

d) a heating means through which said pressurized slurry mixture flows, or to one or more heat jacketed impregnation vessels aligned substantially vertically within which the pressurized slurry mixture is heated to the softening point of the minipellets, or to both in which case the junction is connected to the heating means and the heat jackets around the impregnation vessels are optional, wherein each one or more impregnation vessels are comprised of pipes, each pipe having an inlet and an outlet, said inlet and outlet being shaped as a concentric cone having a larger diameter circular base attached to the inlet or outlet tapering in a dome or trumpet fashion to a smaller diameter;

e) one or more orifice plates through which said pressurized slurry mixture flows into;

f) an expansion vessel for receiving said pressurized slurry mixture; said equipment b) through f) being connected by a piping system.

2. The apparatus of claim 1, further comprising flowmeters for regulating the flow of said slurry, wherein said flowmeters comprise differential pressure flowmeters or electromagnetic flowmeters.

3. The apparatus of claim 2, wherein the mixing means is a receiving vessel fitted with an agitation means.

4. The apparatus of claim 3, wherein said agitation means comprises one or more impellers.

5. The apparatus of claim 1, wherein said pressurizing means comprises one or more pumps.

6. The apparatus of claim 5, wherein said one or more pumps generate a substantially constant mass flow rate and a hydraulic pressure in excess of about 300 p.s.i.g.

7. The apparatus of claim 6, wherein said one or more pumps comprise one or more reciprocating piston pumps or multistaged centrifugal pumps.

8. The apparatus of claim 1, wherein the piping system has one or more inner diameters, said one or more inner diameters being sufficiently small to maintain the flow of pressurized slurry and pressurized slurry mixture therein in a turbulent condition.

9. The apparatus of claim 1, wherein the heating means comprises one or more shell and tube heat exchangers.

10. The apparatus of claim 1, wherein the one or more impregnation vessels have an inner diameter, the inner diameter of the piping system connecting said one or more impregnation vessels being smaller than the inner diameter of the one or more impregnation vessels.

11. The apparatus of claim 1, wherein each of the one or more impregnation vessels have a length and inner diameter dimensions, said length and inner diameter dimensions being sized to provide a total impregnation time from about 10 minutes to about 80 minutes.

12. The apparatus of claim 1, wherein the one or more orifice plates have a hole sufficiently small to maintain a back pressure of at least 300 p.s.i.g.

13. An apparatus for the continuous production of expandable thermoplastic minipellets, comprising:

means for pressurizing a slurry of water and thermoplastic minipellets to a pressure of between 300 to about 550 p.s.i.g.;

entrainment means for adding a blowing agent to the pressurized slurry to form a pressurized slurry/blowing agent mixture without the use of an inert gas;

at least one impregnation vessel which receives the pressurized slurry/blowing agent mixture and is substantially filled by the slurry/blowing agent mixture so as to be substantially vapor free, wherein the slurry/blowing agent mixture is retained within at the least one impregnation vessel for a time sufficient to cause the blowing agent to be impregnated within the thermoplastic minipellets;

a piping system connecting the pressurizing means, the entrainment means, and the at least one impregnation vessel so as to allow continuous flow therebetween under a pressure of at least 300 p.s.i.g.;

an orifice means for creating a differential pressure, the orifice means comprising an orifice plate having a first side and a second side, the first side being connected to the at least one impregnation vessel by the piping system, the orifice means maintaining a constant and continual back-pressure on the first side of the orifice plate;

an expansion vessel connected to the second side of the orifice plate, the expansion vessel having a low pressure relative to the backpressure of the orifice plate, wherein the resulting pressure differential causes the blowing agent impregnated in the thermoplastic minipellets to volatilize upon the discharge of the impregnated thermoplastic minipellets into the expansion vessel;

wherein the orifice plate and the expansion vessel are free of any means to add a pressurized gas.

* * * * *